(12) United States Patent
Sperling et al.

(10) Patent No.: US 8,989,159 B2
(45) Date of Patent: Mar. 24, 2015

(54) SYSTEM AND METHOD MANAGING HOTSPOT NETWORK ACCESS OF A PLURALITY OF DEVICES

(75) Inventors: David Sperling, Laguna Niguel, CA (US); Kevin Warmerdam, Encinitas, CA (US)

(73) Assignee: Smith Micro Software, Inc., Aliso Viejo, CA (US)

( * ) Notice: Subject to any disclaimer, the term of this patent is extended or adjusted under 35 U.S.C. 154(b) by 36 days.

(21) Appl. No.: 13/248,391

(22) Filed: Sep. 29, 2011

(65) Prior Publication Data

US 2012/0082148 A1    Apr. 5, 2012

Related U.S. Application Data

(60) Provisional application No. 61/389,169, filed on Oct. 1, 2010.

(51) Int. Cl.
| | |
|---|---|
| *H04W 4/00* | (2009.01) |
| *H04W 24/08* | (2009.01) |
| *G06Q 30/04* | (2012.01) |
| *H04W 12/08* | (2009.01) |
| *H04W 84/10* | (2009.01) |

(52) U.S. Cl.
CPC .............. *H04W 24/08* (2013.01); *G06Q 30/04* (2013.01); *H04W 12/08* (2013.01); *H04W 84/105* (2013.01)
USPC ......................................................... 370/338

(58) Field of Classification Search
USPC .............. 370/230–235, 236, 236.1, 237, 328, 370/338
See application file for complete search history.

(56) References Cited

U.S. PATENT DOCUMENTS

| 7,587,512 | B2 * | 9/2009 | Ta et al. ......................... 709/233 |
|---|---|---|---|
| 2004/0001467 | A1 * | 1/2004 | Cromer et al. ................. 370/338 |
| 2004/0053599 | A1 | 3/2004 | Karaoguz |
| 2004/0105415 | A1 * | 6/2004 | Fujiwara et al. .............. 370/338 |
| 2005/0175181 | A1 | 8/2005 | Bergs |
| 2005/0282559 | A1 * | 12/2005 | Erskine et al. ............. 455/456.4 |
| 2006/0221919 | A1 * | 10/2006 | McRae et al. ................. 370/338 |
| 2007/0104145 | A1 | 5/2007 | Jan |
| 2008/0159232 | A1 | 7/2008 | Thalanany |
| 2010/0169475 | A1 * | 7/2010 | Woundy et al. ............... 709/224 |
| 2010/0184450 | A1 * | 7/2010 | Chen et al. ..................... 455/455 |
| 2010/0191576 | A1 | 7/2010 | Raleigh |
| 2010/0208698 | A1 | 8/2010 | Lu |
| 2012/0039248 | A1 * | 2/2012 | Schneider et al. ............ 370/328 |

FOREIGN PATENT DOCUMENTS

| WO | WO 01/89155 | 11/2001 |
|---|---|---|
| WO | WO 2005/034407 | 4/2005 |
| WO | WO 2005/048011 | 5/2005 |
| WO | WO 2005/076884 | 8/2005 |
| WO | WO 2005/098674 | 10/2005 |
| WO | WO 2010/046263 | 4/2010 |
| WO | WO 2010/088075 | 8/2010 |

\* cited by examiner

*Primary Examiner* — Peter Cheng
(74) *Attorney, Agent, or Firm* — Farjami & Farjami LLP

(57) ABSTRACT

There is provided a system and method for managing hotspot network access for a plurality of devices. There is provided a mobile broadband hotspot comprising a processor configured to detect an occurrence of an event, determine a device from the plurality of devices to receive a notification of the event, determine a policy directed to the device, and execute the policy on the mobile broadband hotspot or on the device. Accordingly, by providing notifications of events to appropriate devices of the network, a better user experience is maintained. Moreover, the mobile broadband hotspot may transmit event notification to specific devices that may be affected by the execution of the policy in order to provide a better user experience for the users of those devices.

16 Claims, 7 Drawing Sheets ial Application No. 61/389,169 filed on Oct. 1, 2010, which is hereby incorporated by reference in its entirety.

BACKGROUND OF THE INVENTION

1. Field of the Invention

The present invention relates generally to hotspot network access. More particularly, the present invention relates to managing hotspot network access of a plurality of devices.

2. Background Art

The use of mobile broadband hotspots has further increased the ubiquity and convenience of receiving wireless broadband access. The Internet access speed for mobile broadband hotspots is continuously improving and is presently conforming to the fourth-generation wireless telephone technology (4G) standard. A mobile broadband hotspot allows multiple devices to connect to the mobile broadband hotspot through Wi-Fi signals, Bluetooth signals, or other types of wireless signals. As a result, many devices may connect to a nearby mobile broadband hotspot for instant access to the Internet. Since popular mobile devices such as smartphones, for example, may be utilized as mobile broadband hotspots, the distribution of wireless Internet through mobile broadband hotspots is more prevalent and convenient.

Oftentimes, the Internet service provider, mobile broadband hotspot, or devices connected to the mobile broadband hotspot may experience events that will cause the mobile broadband hotspot to perform poorly. The mobile broadband hotspot may be reaching a low battery power state resulting in the device soon being shut off, too many mobile devices may be connected to the mobile broadband hotspot thereby decreasing the bandwidth for each mobile device, or the device may suddenly experience low signal strength from the Internet service provider. The occurrence of these events may reduce the quality of service for the end users of the mobile broadband hotspot. For example, the signal strength provided by the Internet service provider to the mobile broadband hotspot may decrease suddenly and without warning or the coverage could drop from 4G to 3G, and this decrease may negatively affect the quality of services for the other mobile devices connected to the mobile broadband hotspot.

Unfortunately, the end users experiencing a decrease in the quality of service provided by the mobile broadband hotspot are not presented with specific information concerning the decrease. Without receiving adequate information concerning the causes of the reduction of the quality of services and without being presented any opportunity to rectify the problem, the end users of the mobile broadband hotspots may simply become frustrated with the mobile broadband hotspot service.

Accordingly, there is a need to overcome the drawbacks and deficiencies in the art by improving the information shared with users regarding the reduction in the quality of service in order to maintain a better user experience.

SUMMARY OF THE INVENTION

There is provided systems and methods for managing hotspot network access of a plurality of devices, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present application is directed to a system and method for managing a hotspot network access and for managing the billing for that hotspot network access. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
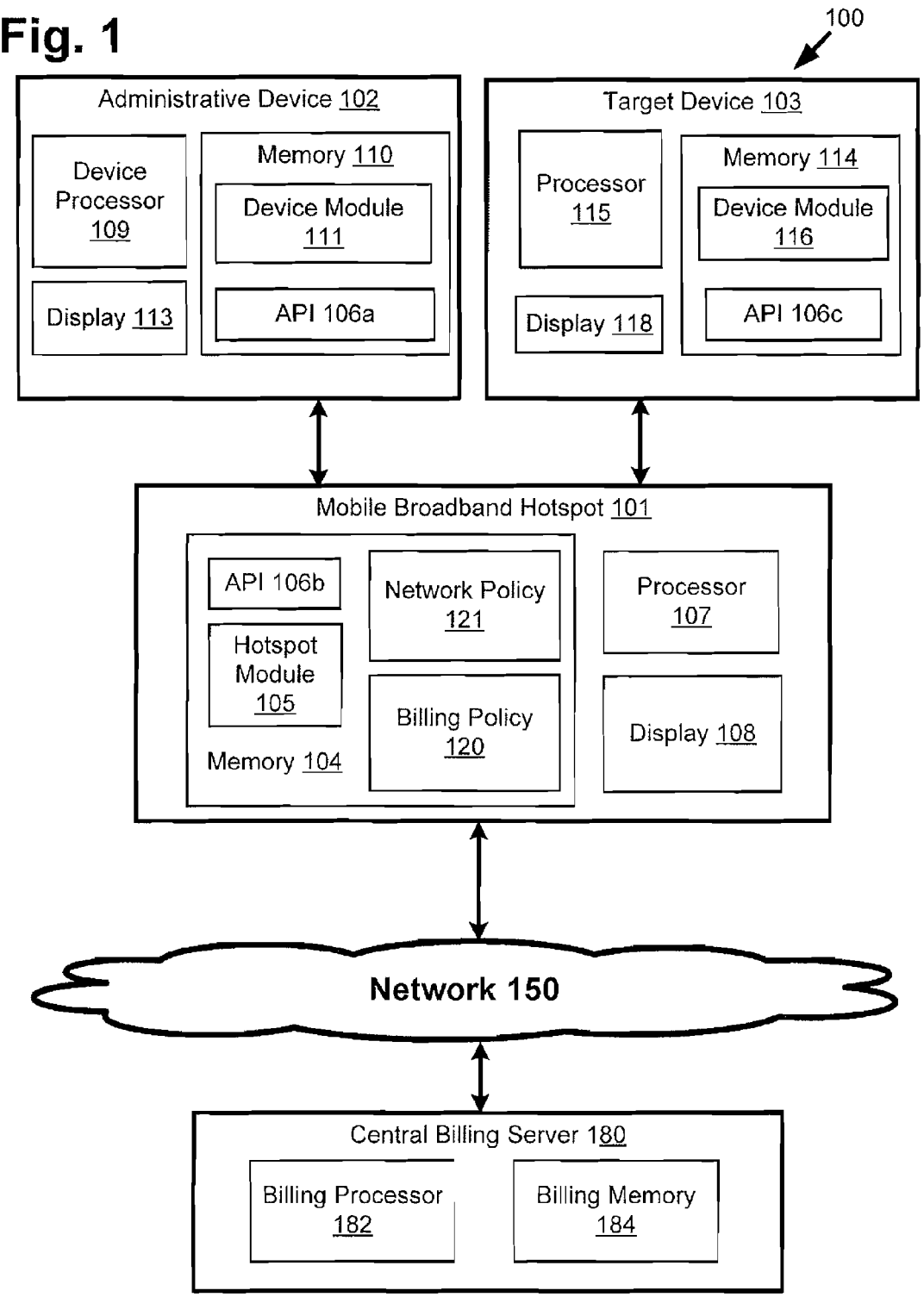
FIG. 1 presents an environment in which a mobile broadband hotspot may manage the hotspot network access of a plurality of devices and manage the billing of the hotspot network access, according to one embodiment of the present invention.

FIG. 1 presents an environment in which a mobile broadband hotspot may manage the hotspot network access of a plurality of devices and manage the billing of the hotspot network access, according to one embodiment of the present invention. Environment 100 of FIG. 1 includes mobile broadband hotspot 101, administrative device 102, target device 103, network 150 and central billing server 180. Mobile broadband hotspot 101 includes memory 104, processor 107, and display 108. Memory 104 includes hotspot module 105, billing policy 120, and network policy 121 and application programming interface (API) 106b. Administrative device 102 includes device processor 109, memory 110, and display 113. Memory 110 includes device module 111 and API 106a. Target device 103 includes processor 115, memory 114, and display 118. Memory 114 includes device module 116 and API 106c. API 106a, 106b and 106c may be a set of similar APIs. Device module 111, hotspot module 105, and device module 116 may be implemented in accordance with APIs 106a, 106b, and 106c, respectively, in order to allow communication and data exchanges between mobile broadband hotspot 101 and administrative device 102, and between mobile broadband hotspot 101 and target device 103, and enabling communication between the administrative device 102 and target device 103 via the mobile broadband hotspot 101.

Displays 113, 118, and 108 may each comprise a LCD (liquid crystal display) monitor that may also serve as a touch-sensitive input device. In other embodiments, displays 113, 118, and 108 may be any type of monitor. While not shown in FIG. 1, administrative device 102 and target device 103 may have additional input devices, such as keyboards or optical mice, connected to administrative device 102 and target device 103, for example. Central billing server 180 includes billing processor 182 and billing memory 184.

Administrative device 102 and target device 103 may comprise any type of mobile device, including smartphones, laptops, or personal digital assistants (PDAs), for example. In other embodiments, administrative device 102 and target device 103 may also be devices such as printers or fax machines that generally do not have displays, for example. Mobile broadband hotspot 101 may comprise any type of dedicated hotspot device. In other embodiments, mobile broadband hotspot 101 may comprise a smartphone, laptop, PDA or any other mobile device capable of being configured to function as a hotspot device. Central billing server 180 may comprise any type of server. While central billing server 180 of FIG. 1 is shown to be separate from mobile broadband hotspot 101, in alternative embodiments, central billing server 180 may comprise a local database on mobile broadband hotspot 101, thereby allowing central billing sever 180 to be integrated within mobile broadband hotspot 101 to be integrated with mobile broadband hotspot 101. Network 150 may comprise any type of network, such as the Internet, 3G or 4G mobile broadband network or other wireless network, for example. Administrative device 102 and target device 103 may detect and connect to mobile broadband hotspot 101 through a wireless network conforming to the Institute of Electrical and Electronics Engineers (IEEE) 802.11 standard, such as Wi-Fi, or a Bluetooth, or any other type of wireless network conforming to some other wireless protocol transmitted from mobile broadband hotspot 101. In other embodiments, administrative device 102 and target device 103 may be physically connected to mobile broadband hotspot 101 through a wire or other connection cables as well. Once properly connected to mobile broadband hotspot 101, administrative device 102 and target device 103 may have access to network 150. While only a single administrative device 102 and target device 103 are shown in FIG. 1, in alternative embodiments, any number of administrative devices and/or target devices may be connected to mobile broadband hotspot 101.

In the present embodiment, processors 107 and 115, device processor 109 and billing processor 182 may comprise any type of processor, including, but not limited to, central processing units (CPUs). In the present embodiment, memory 104, memory 110, memory 114, and billing memory 184 may comprise any type of machine-readable storage device such as a volatile or non-volatile memory. Hotspot module 105 may comprise any type of software application implemented to allow mobile broadband hotspot 101 to manage network 150 access by detecting the occurrences of events that may affect or potentially affect the performance of mobile broadband hotspot 101. Hotspot module 105 may be configured to recognize these events and, subsequently, to instruct processor 107 to execute policies in response to recognizing any events. In the present embodiment, hotspot module 105 may be used to allow mobile broadband hotspot 101 to determine and set permission levels for all devices, including administrative device 102 and target device 103, for example. Administrative device 102 and other devices with administrative permission levels may also change the permission levels of other connected devices with lower than administrative permission.

Network policy 121 may comprise a data file containing network management policies, events, permissions and associations between these event types and polices. Network policy 121 may be an updatable file. Administrative devices such as administrative device 102, for example, may also reconfigure or update network policy 121. Moreover, device management servers may remotely reconfigure or update network policy 121 through network 150 or directly to the mobile broadband hotspot 101. Thus, network policy 121 may be modified by local devices granted with administrative privileges or by other properly privileged remote devices through network 150. Network policy 121 may be securely stored within memory 104 or directly to the mobile broadband hotspot 101, such as by an IT administrator or Mobile Network Operator (MNO). For example, network policy 121 may be encrypted. In the present embodiment, hotspot module 105 may also create billing policies of data usages from devices connected to mobile broadband hotspot 101. Billing policy 120 may comprise a data file comprising present billing policies for generating billing statements for individual data usages.

In the present embodiment, mobile broadband hotspot 101 may create a user profile for each initial user. The user profile may include a credential comprising identification information used to identify an individual user regardless of the device the user may be using to connect to mobile broadband hotspot 101. Upon receiving a request to connect to mobile broadband hotspot 101, processor 107, executing hotspot module 105, may present on the display of the connecting device a request for a credential input. The request may ask a user with a prior user profile to input the credential information such as a username, password, device identification numbers, personal billing information, digital certificate, and other pertinent information. A new user without a previously created user profile on mobile broadband hotspot 101 may be asked to create a new user profile comprising new credential information. The user profiles, including associated credentials, may be securely stored within memory 104.

Information in a user profile, including the credential, may be authenticated through billing policy 120. Billing policy 120 may comprise a plurality of existing credentials. A returning user's credential may be required to match a credential in billing policy 120, wherein the billing policy 120 may access a local billing database or third party billing database to authenticate the user's credentials. Mobile broadband hotspot 101 may also ensure that the credential has no billing issues or concerns that need to be resolved. For example, billing policy 120 may indicate that a credential has failed to pay for previous data usage and may cause hotspot module 105 to block access to network 150 for that credential.

Processor 107, executing hotspot module 105, upon receiving an input of a credential may perform an authentication of the credential using billing policy 120. Accordingly, billing policy 120 may comprise one or more credentials within the billing policy 120 that may be denied access to mobile broadband hotspot 101. In other embodiments, mobile broadband hotspot 101 may transmit a credential to central billing server 180 for similar authentication.

Device modules 111 and 116 may comprise applications that are delivered to memory 110 and memory 114, respectively, upon a successful connection of administrative device 102 and target device 103 to mobile broadband hotspot 101. Device modules 111 and 116 may be executed to allow administrative device 102 and target device 103 to interact with mobile broadband hotspot 101, including receiving notifications of events and billing statements from mobile broadband hotspot 101. In the present embodiment, hotspot module 105 and device modules 111 and 116 may conform to similar APIs 106b, 106a and 106c, respectively. By conforming to similar APIs, hotspot module 105 and device modules 111 and 116 may communicate with each other even with modification to hotspot module 105, device modules 111 or 116. Different permission levels granted to administrative device 102 and target device 103 may result in different implementations to device modules 111 and 116.

In the present embodiment, mobile broadband hotspot 101 may grant one of five permission levels to a mobile device connecting to mobile broadband hotspot 101. The five permission levels may be comprised of administrative permission, trusted client permission, guest permission, blocked and blacklisted. Only devices granted administrative permission, trusted client permission, or guest permission may access the Internet via network 150. Devices granted blocked permission level may also connect to mobile broadband hotspot but may be prohibited from consuming any bandwidth, thereby effectively blocked from accessing the Internet via network 150. Thus, a blocked device may still receive any alert notifications or messages intended for the blocked devices. Devices granted blacklisted permission cannot access network 150 or connect to mobile broadband hotspot 101. Devices granted trusted client permission may have more privileges than devices with guest permission but less privileges than devices granted administrative permission. Devices with administrative permission, for example, may be allowed to modify network policy 121, billing policy 120, change the permissions levels of other devices, or reject authentication attempts by other mobile devices attempting to connected to mobile broadband hotspot 101. Administrative devices 101 may also set the time limit for network 150 access of other devices with lower permission levels In other embodiments, more or less types of permission levels may be implemented as desired.

In one embodiment, mobile broadband hotspot 101 may grant administrative device 102 with administrative permission and may grant target device 103 with guest permission. Accordingly, administrative device 102 may have more privileges than target device 103. While FIG. 1 shows both administrative device 102 and mobile broadband hotspot 101 as separate devices, in other embodiments, mobile broadband hotspot 101 and administrative device 102 may be integrated into a single mobile device, such as a smartphone also functioning as a hotspot device, for example.

In the present embodiment, processor 107, executing hotspot module 105, may be configured to detect and monitor the occurrence of an event, the event being any event that may affect or potentially affect the quality of service given by mobile broadband hotspot 101 or operation thereof, thereby affecting the quality of service to administrative device 102, target device 103, or any other of the plurality of devices connected to mobile broadband hotspot 101. An event may comprise a lowering of the battery level of mobile broadband hotspot 101 to a predetermined amount, an initial connection from another device to mobile broadband hotspot 101, a downgrading or upgrading of the broadband connectivity of mobile broadband hotspot 101 (e.g., 4G coverage downgraded to 3G coverage), or simply a mobile device connecting to mobile broadband hotspot 101.

An event may also occur when a device, such as target device 103 without administrative permission, connected to mobile broadband hotspot 101 consumes a percentage of the bandwidth that exceeds a pre-determined percentage set for that device. For example, target device 103 may be attempting to download multiple large data files such as music or video files. In the process of downloading the large files target device 103 may gradually consume more bandwidth from network 150. Bandwidth is the data transfer rate that may be generally measured in bits per second, as known in the art. Mobile broadband hotpot 101 may have a pre-determined bandwidth usage percentage of 50% set for target device 103, for example. Thus, if the bandwidth from network 150 is 2.0 megabits per second (Mbs), and in the course of downloading the large files, target device 103 exceeds 1.0 Mbs, then mobile broadband hotspot 101 may detect an event. The handling of the event will be discussed in detail in the descriptions further below.

An event may also occur when a device, such as target device 103, consumes within a predetermined period of time a total number bytes exceeding an allotted number of bytes for the predetermined period of time for that device. For example, mobile broadband hotspot 101 may allot target device 103 or the user of target device 103 one gigabyte (1 GB) of data per billing cycle or per predetermine period of time. If in the course of consuming data through network 150, target device 103 consumes more than the allotted 1 GB in the billing cycle or predetermined period of time, then such an occurrence may also trigger an event within mobile broadband hotspot 101.

Yet another event may comprise a state change of the mobile broadband hotspot 101 from a non-roaming state to a roaming state or vice versa. Given the easily portable nature of mobile broadband hotspot 101, mobile broadband hotspot 101 may be used within moving areas such as in trains or buses to provide a network access for a plurality of devices. Thus, when mobile broadband hotspot 101 is roaming, such roaming may trigger an event as well, such as for example to deny or provided limited connectivity or services to any target device 103. Likewise, if the roaming mobile broadband hotspot 101 stops roaming, then another event may be triggered as well. Many other types of events are possible and may be recognized by mobile broadband hotspot 101.

Mobile broadband hotspot 101 may use hotspot module 105 to recognize various events. Hotspot module 105 may be configured or updated to detect additional events as well. Hotspot module 105 may be updated by remote devices through network 150 or by devices locally connected to mobile broadband hotspot 101. In other embodiments, hotspot module 105 may even be modified directly from mobile broadband hotspot 101. Hotspot module 105 may also use network policy 121 to detect events.

After detecting an event, processor 107, executing hotspot module 105, may determine a device from the plurality of devices to receive a notification of the event. The device from the plurality of devices may be administrative device 102, target device 103 or any other device. In other embodiments, mobile broadband hotspot 101 may also be determined to receive the notification of the event as well. After determining the device, processor 107, executing hotspot module 105, may send a notification of the event to the device for showing within a display of the device. Notifications for all events may be required to be transmitted to a device with an administrative permission level. Thus, administrative device 102 will generally receive all event notifications from mobile broadband hotspot 101.

In order to increase positive user experience of the network access for the connected devices, mobile broadband hotspot 101 may be further configured to implement policies associated with the occurrence of the events in order to improve the shared network access. In one embodiment, processor 107, executing hotspot module 105, may be configured to determine a policy directed to a device from the plurality of devices connected to mobile broadband hotspot 101. The determined policy may generally be associated with or customized to the event. As previously discussed, the associations of policies to events may be stored within network policy 121 of memory 104. Moreover, as previously stated, network policy 121 may be updated from local devices or from remote devices through network 150. Thus, the determined policy may have been set remotely through network 150 by an IT administrator, Mobile Network operator (MNO) or a remote data management server.

The policy may be an action or a set of actions that may be implemented and carried out by mobile broadband hotspot 101 in order to affect target device 103 or other connected devices. In the present embodiment, a policy may comprise an action to change a quality of service for or the operation of one or more connected devices. For example, the executed policy may reduce the consumable bandwidth of a particular device, such as target device 103. The reduction may reduce bandwidth partially or completely, thereby blocking the device from accessing network 150 for a period of time or indefinitely. A policy may also comprise an action to change the permission level of a device. For example, the permission level of a presently connected device may be changed from guest permission level to blacklisted permission level, thereby effectively blocking the device from even connecting to mobile broadband hotspot 101. As previously discussed, the association between policies and events may be stored within network policy 121. Hotspot module 105 may be used to allow policies, events and associations between policies and events to be created and stored within network policy 121 residing in memory 104. In alternative embodiments, policies and their associations with events may be set through network 150 by a mobile network operator or other secure sources and delivered to mobile broadband hotspot 101.

Upon determining the policy, processor 107, executing hotspot module 105, may be configured to execute the policy on mobile broadband hotspot 101 or on the device. As previously discussed, policy may reduce or cut off completely the quality of service to the device. Generally, in most instances the policy shall be executed within mobile broadband hotspot 101. For example, the executed policy on mobile broadband hotspot 101 may cause mobile broadband hotspot 101 to block or prohibit target device 103 from accessing network 150 because target device 103 has consumed more bytes than the allotted number of bytes within a predetermined time period or billing cycle. In another instance, instead of blocking, the executed policy on mobile broadband hotspot 101 may cause mobile broadband hotspot to reduce the data transfer speed, or bandwidth, of target device 103 to a much lower level but still allow target device 103 to maintain a connection to network 150 through mobile broadband hotspot 101. In one embodiment, prior to executing the policy, processor 107, executing hotspot module 105, may be configured to send a notification of the policy being executed to the device affected by the execution of the policy for showing within the display of the device prior to executing the policy. While mobile broadband hotspot 101 may determine the policy by using network policy 121, in other embodiments, the determining the policy may comprise receiving the policy from administrative device 102, as well.

Generally, a powered on administrative device 102 shall always receive a notification of all events while other devices without administrative privilege, such as target device 103, may or may not receive the notification of some events. In administrative device 102, device processor 109, executing device module 111, may receive the notification of an event from mobile broadband hotspot 101 using API 106*a*. Device processor 109, executing device module 111, may transmit the notification to target device 103 of the plurality of devices. Transmitting the notification to target device 103 may comprise device processor 109 selecting target device 103 using API 106*a*. The selection may be induced from display 113. In one embodiment, prior to transmitting the notification to target device 103, device processor 109, executing device module 111, may be configured to show data usage information corresponding to the user of target device 103 on display 113 within administrative device 102. The data usage information may be displayed in a graphical chart or any other graphical representation.

In one embodiment, device processor 109, executing device module 111, may direct mobile broadband hotspot 101 to execute a policy on target device 103, which may receive the notification of events. Prior to directing mobile broadband hotspot 101 to execute the policy, device processor 109, executing device module 111, may be configured to receive a policy to execute from a user input from administrative device 102. The user input may be performed on display 113. Therefore, while mobile broadband hotspot 101 may automatically determine the policy to execute to affect a specific device from the plurality of devices and send a notification of the event to that specific device, administrative device 102 may also be used to select and execute policies affecting specific devices and to send notifications of the events to specific devices.

Mobile broadband hotspot 101 may also be used to keep track of data usages for various credentials in order to create a billing statement for each individual credential and/or user. As stated earlier, new users may create a credential, and returning users may input information used to associate them with a credential. Upon receiving or determining the credential based on inputs from a device, processor 107, executing hotspot module 105, may perform an authentication of the credential using billing policy 120. The authentication may serve the purpose of ensuring that the credential contains adequate billing information. Processor 107 may even transmit the credential to central billing server 180 for further authentication. In an embodiment, the processor 107 may authenticate the credential using billing policy 120 that may be located in memory 104. Processor 107, executing hotspot module 105, may be further configured to track all data usage associated with that credential using API 106. Then processor 107, executing hotspot module 105, may be further configured to submit the credential and data usage associated with the credential to central billing server 180 or to any other billing server across network 150 or locally in memory 140.

Central billing server 180 (or other source) may create a billing statement associated with the credential and data usage and transmit the billing statement to mobile broadband hotspot 101. Then processor 107, executing hotspot module 105, may modify the billing statement associated with the credential using billing policy 120 in response to receiving the billing statement from central billing server 180 (or other source). Processor 107, executing hotspot module 108, may transmit the billing statement to target device 103 associated with the credential for showing on display 118 of target device 103. Processor 107, executing hotspot module 105, may be further configured to acquire a payment associated with that data usage from target device 103. In the present embodiment, a payment may be submitted electronically from display 118. As previously stated, display 118 may be touch-sensitive and may serve as an input device. In other embodiments, a separate input device connected to target device 103 may be used to submit payments.

The hotspot module 105 may also allow one user to assume and/or credit the data usage bill of another user. Processor 107, executing hotspot module 105, may receive from a device, such as target device 103, a request to pay for another data usage associated with another credential. Then, using billing policy 120, processor 107, executing hotspot module 105, may further create another billing statement associated with another data usage. Processor 107, executing hotspot 105, may transmit another billing statement to that device for showing on the display of that device. Finally, processor 107, executing hotspot 105, may acquire a payment for another data usage from the device. The descriptions for FIGS. 4 and 5 shall further detail the capabilities for creating billing policies on mobile broadband hotspot 101.

Figure 2:
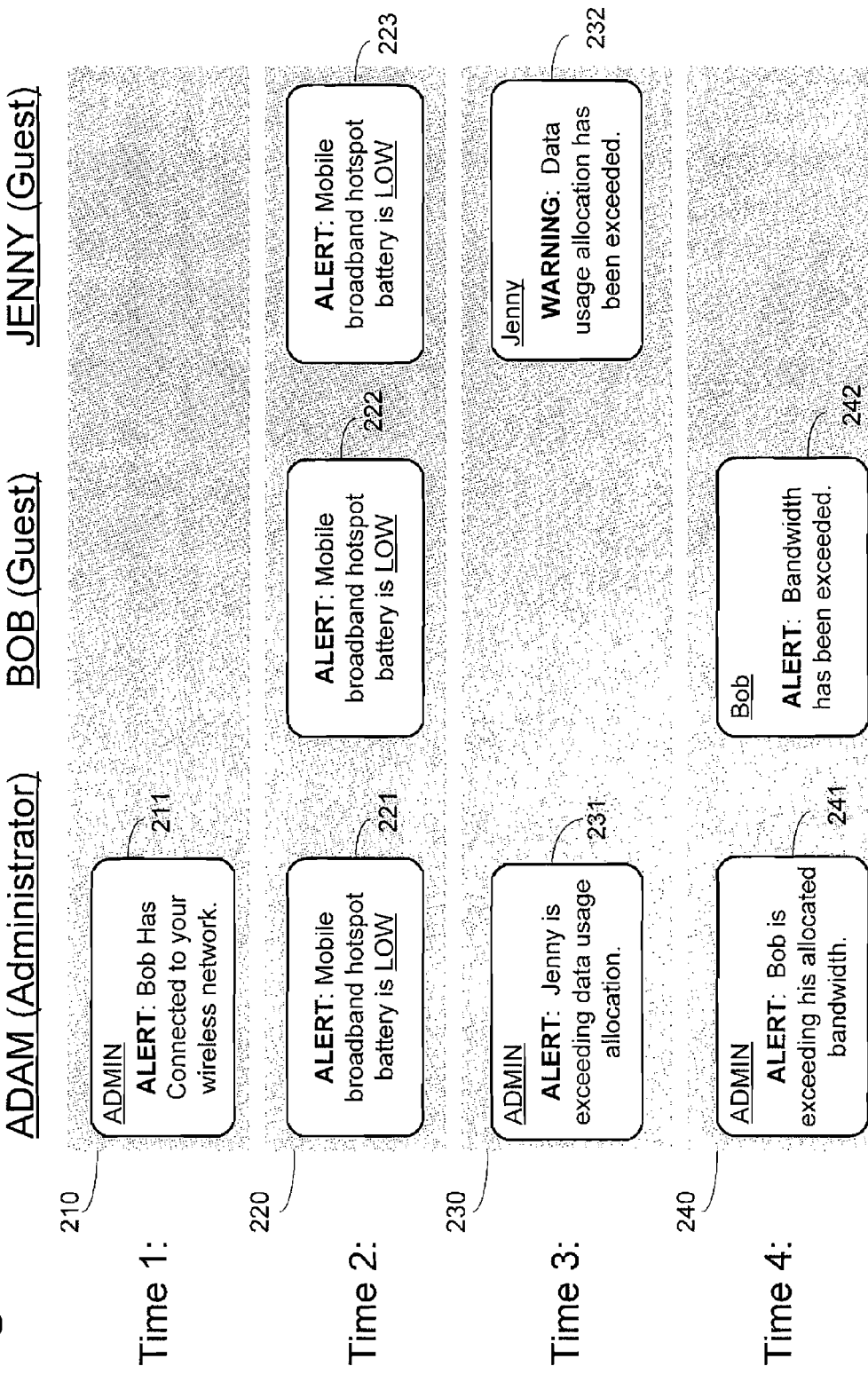
FIG. 2 presents a diagram illustrating the presentation of notifications on the displays of devices with different permission levels, according to one embodiment of the invention.

FIG. 2 presents a diagram illustrating the presentation of notifications on the displays of devices with different permission levels, according to one embodiment of the invention. Diagram 200 of FIG. 2 includes time periods 210, 220, 230, and 240. Time period 210 includes notification 211. Time period 220 includes notifications 221, 222, and 223. Time period 230 includes notifications 231 and 232. Time period 240 includes notifications 241 and 242.

In the present embodiment, connected devices may be initially authenticated by mobile broadband hotspot 101 of FIG. 1 to ensure a match between the user inputs and an existing credential. As previously discussed, authentication may require the device user to provide a credential including a username and password, personal billing information, digital certification and/or any other type of pertinent information. In other embodiments, mobile broadband hotspot 101, using hotspot module 105, may automatically examine the device for identification information, such as the MEID (Mobile Equipment Identifier) and/or IMEI (International Mobile Equipment Identity), for example.

As previously discussed, mobile broadband hotspot 101 may transmit notifications of events to various devices in order to allow users to become aware of the events and policies that may affect their user experience with mobile broadband hotspot 101. Devices with different permission levels may not have the same privilege of receiving the same notifications from mobile broadband hotspot 101. For FIG. 2, it may be proper to assume that three mobile devices of three users named "Adam," "Bob," and "Jenny" may be connected to mobile broadband hotspot 101. It may be proper to assume that Adam's device may be granted with administrative permission, while Bob and Jenny's devices may each be granted guest permission. Therefore, Adam's device may correspond to administrative device 102 of FIG. 1 and Bob and Jenny's devices may correspond to target device 103 of FIG. 1.

At time period 210, the administrator device used by Adam may receive notification 211 for presentation on a display. Notification 211 may comprise a textual message alerting Adam to the event of a device used by a user named "Bob" connecting to mobile broadband hotspot 101. In the present embodiment, hotspot module 105 may be configured to transmit notifications of all events to a device connected with administrative permission. Jenny's device will not receive notification 211 because Jenny's device does not have administrative permission. In the present embodiment, devices with guest permission may only receive notifications of events that may affect the connectivity of that device. Bob's device may not receive notification 211 as well because Bob's connecting to mobile broadband hotspot 201 does not yet affect the connectivity of the device Bob is presently using.

At time period 220 notifications 221, 222, and 223 may be transmitted to the mobile devices used by Adam, Bob, and Jenny. Notifications 221, 222, and 223 may concern the single event of a lowering of battery power of mobile broadband hotspot 201 to a predetermined level. Since the lowering of battery power may result in an implementation of a policy that may affect the quality of service for all connected devices, all connected devices may receive a notification of such an event. At time period 230 notifications 231 and 232, concerning the event of Jenny exceeding her data usage allocation, may be transmitted to the devices used by Adam and Jenny, respectively. Since the event that triggered the notification does not affect the connectivity of the device used by Bob, the device used by Bob may not receive such notification. At time period 240 notifications 241 and 242 may be transmitted to the devices used by Adam and Bob. Sending of notifications 241 and 242 may be triggered by the event of Bob exceeding a bandwidth allocation set for the device used by Bob. Since this event does not directly concern Jenny, the device used by Jenny may not receive any notification of the event. In other embodiments, the rules for transmitting various notifications of events may be reconfigured by mobile broadband hotspot 101. In yet alternative embodiments, the rules for transmitting the notifications may be changed by a device with administrative permission or trusted client permission.

Figure 3:
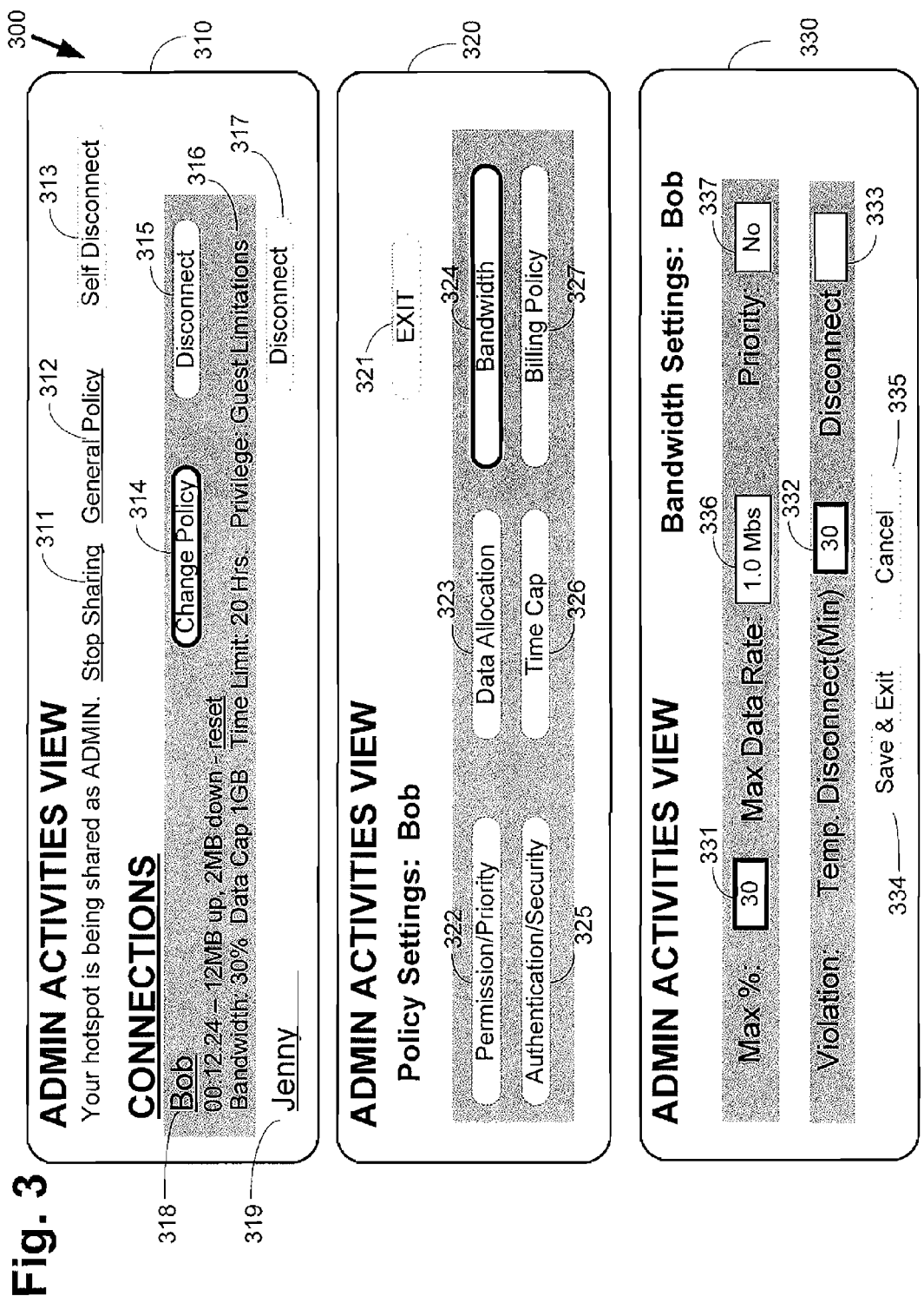
FIG. 3 presents a diagram of exemplary graphical user interfaces for setting policies and events, and associating policies with events from a device connected to the mobile broadband hotspot, according to one embodiment of the present invention.

FIG. 3 presents a diagram of exemplary graphical user interfaces for setting policies and events, and associating policies with events from a device connected to the mobile broadband hotspot, according to one embodiment of the present invention. Diagram 300 of FIG. 3 includes graphical user interfaces (GUIs) 310, 320 and 330. GUI 310 includes stop sharing link 311, general policy link 312, administrative disconnect button 313, change policy button 314, disconnect guest buttons 315 and 317, guest user link 318 and 319, and guest information 316. GUI 320 includes exit button 321, permission button 322, data allocation button 323, bandwidth button 324, authentication button 325, time cap button 326, and billing policy button 327. GUI 330 may include bandwidth text box 331, max data rate text box 336, bandwidth priority text box 337, temporary block text box 332, block text box 333, save and exit button 334 and cancel button 335.

GUIs 310, 320, and 330 may be presented within an individual applet, application window, web browser, browser pop-up, or any other type of visual representation components on a display screen of a device with administrative permission, such as administrative device 102 of FIG. 1. A device with administrative permission may define events and set policies. Accordingly, mobile broadband hotspot 101 of FIG. 1 may grant administrative device 102 with the capability to define events and set policies and to associate the policies with events so the occurrences of an event may trigger the execution of one or more associated policies on mobile broadband hotspot 101 or on target device 103 of FIG. 1.

GUI 310 may allow the user to check the general connection information of other devices connected to the mobile broadband hotspot. Stop sharing link 311 may be used to prevent any device from connecting to mobile broadband hotspot 101. In one embodiment, stop sharing link 311 may be used to reduce or turn off the Wi-Fi signal strength from mobile broadband hotspot 101 while mobile broadband hotspot 101 is in access point mode. General policy link 312 may be used to set and change other general policies. Administrative disconnect button 313 may be used to disconnect administrative device 102 from mobile broadband hotspot 101. Guest user link 318, which may be associated with the device used by user "Bob," may be used to display guest information 316 for a particular device connected to mobile broadband hotspot 101 and to display change policy button 314. Disconnect guest button 315 may be used to disconnect, or blacklist the device used by Bob. Guest user link 319, which may be associated with the device used by user "Jenny," may be used to display guest information for that device as well. In FIG. 3, guest user link 319 may be unused. Disconnect guest button 317 may be used to disconnect the device used by Jenny from mobile broadband hotspot 101.

In the present embodiment, GUI 320 may be presented on display 113 of administrative device 102 after change policy button 314 is used. Exit button 321 may be used to exit GUI 320. Permission button 322 may be used to change the permission level for any device, such as the device used by Bob. Data allocation button 323 may be used to access another graphical user interface that allows an upper limit to be set for the data usage of any device, such as the device used by Bob. If the data usage of any device, such as the device used by Bob exceeds the upper limit, then an event may occur and a policy associated with that event may be executed on the device any device, such as the device used by Bob. Likewise, bandwidth button 324 may be used to set a limit on the proportion of bandwidth consumed by any device, such as the device used by Bob, or maximum data rate, or priority of bandwidth relative to other users. Authentication button 325 may be used to require a device to encounter a different authentication procedure during a later login. Time cap button 326 may be used to set a time limit during which any device, such as the device used by Bob may be connected to mobile broadband hotspot 101. Billing policy button 327 may be used to set a method of billing any device, such as that of Bob for data usage committed by the device, such as Bob's device.

Bandwidth button 324 may be used to cause GUI 330 to be presented onto display 113 of administrative device 102. GUI 330 may be used to set the details of the bandwidth allocation any device, such as for the device used by Bob. An integer number between "0" and "100" may be entered into bandwidth text box 331 to indicate the maximum percentage of the bandwidth that may be used by any device, such as the device used by Bob. Consuming a higher percentage of the bandwidth than the percentage set in bandwidth text box 631 may constitute an event. Likewise, max data rate text box 336 may be used to set the maximum data rate consumed by a mobile device, such as target device 103. For example, the device used by Bob may be set to have a maximum data rate of 1.0 Mbs within max data rate text box 336. Therefore, if Bob's device is consuming data above the maximum set rate of 1.0 Mbs, then an event may be triggered. Bandwidth priority text box 337 allows administrative device 102 to set the priority of bandwidth consumption among users. For example, administrative device 102 may set bandwidth priority text box 337 to "No" in order to disallow Bob's device to consume any data at a higher priority than the other devices. Similarly, bandwidth priority text box 337 may be set to "Yes" in other instances, thereby allowing Bob's device to consume data at a higher priority. The levels of priority data consumption may vary and they may be set within mobile broadband hotspot 101. For example, in FIG. 3a, had Bob's device been given priority, Bob's device will receive its request data before other devices receive their requested data. By default, administrative users receive the highest priority, then trusted users, and then guests. In another embodiment, all users may receive the same bandwidth priority. Bandwidth text box 331, max data rate text box 336, and bandwidth priority text box 337 may function exclusively or in conjunction with each other. In other embodiments, the definitions of the events may be altered to suite the needs of mobile broadband hotspot 101.

Another event may occur when a device, such as Bob's device, consumes a disproportionate amount of data relative to the amount of data consumed by the other plurality of devices, then such disproportionate data consumption may cause an event, as well. For example, if Bob's device causes a large spike in data usage through mobile broadband hotspot 101, then mobile broadband hotspot 101 may interpret such spike in data usage as an event caused by Bob's device. The tolerated level of disproportionate data consumption and the time period in which the tolerated disproportionate data may occur may be set within mobile broadband hotspot 101 and may vary from user to user.

One or more policies in response to the occurrence of any events set in GUI 330 may be set within GUI 330 as well. Temporary block text box 332 may accept an integer number indicating the number of minutes the device used by Bob may be blocked from the mobile broadband hotspot if an event set in bandwidth text box 331, max data rate text box 336, and bandwidth priority text box 337 occurs. Block text box 333 may be used to set the policy that if device used by Bob causes any bandwidth related events, blocking of that device from mobile broadband hotspot 101 will occur and thus the device will not be able to access network 150. In the present embodiment, Bob may be reinstated by administrative device 102 at a later time.

Thus, FIG. 3 presents one example of using administrative device 101 to define the events and set the policies associated with those events for each credential individually. Moreover, as previously discussed, events may also be caused by mobile broad hotspot 101 or from other sources. As previously discussed, GUI 320 may allow many other types of events and policies to be set or defined. In other embodiments, group policies may be set based on permission level. All changes made from administrative device 101 may be stored within mobile broadband hotspot 101. As previously mentioned, event and policy information may be stored within network policy 121 of memory 104.

Figure 4:
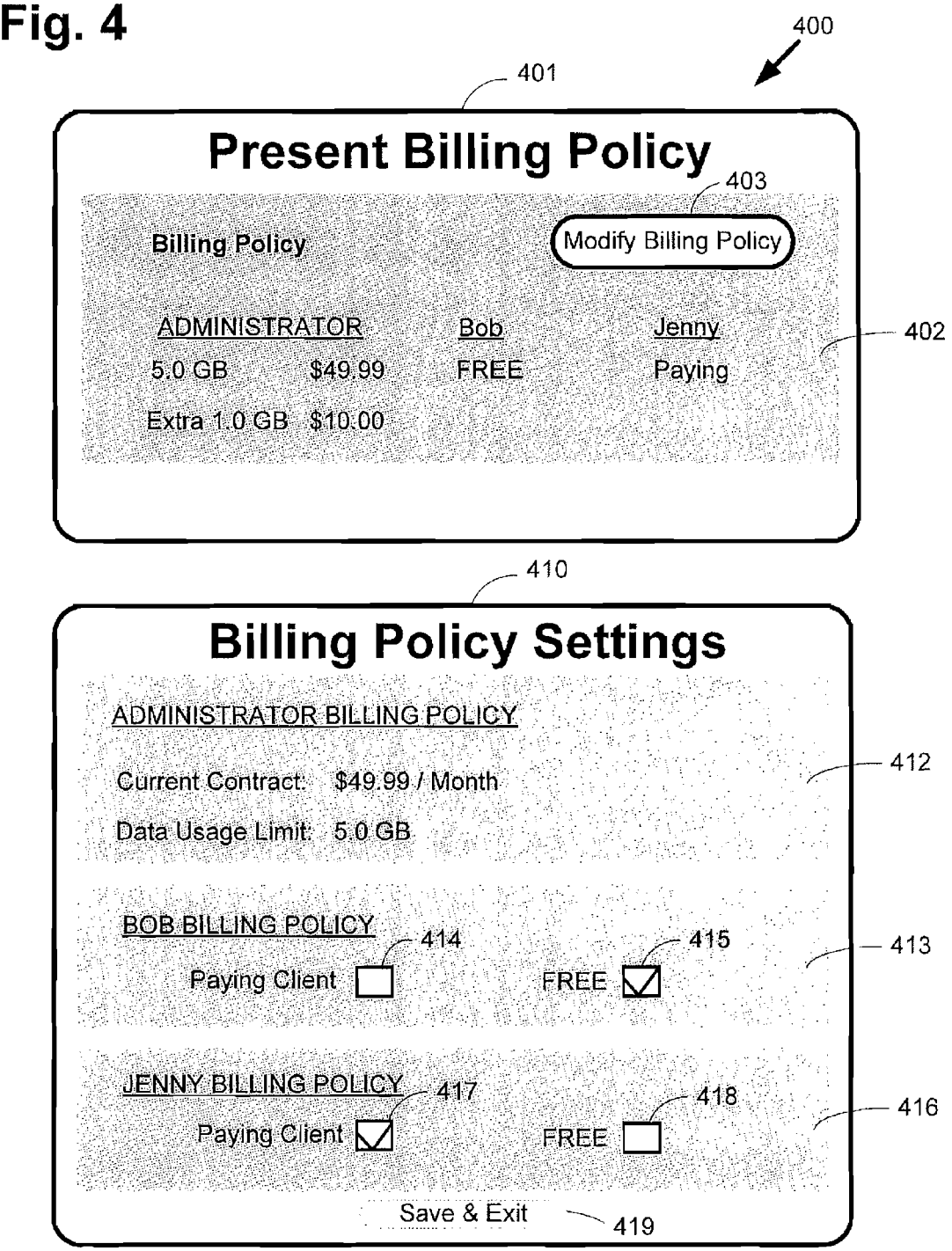
FIG. 4 presents a diagram of graphical user interfaces for setting the billing policy for devices presently connected to the mobile broadband hotspot, according to one embodiment of the invention.

FIG. 4 presents a diagram of graphical user interfaces for setting the billing policy for devices presently connected to the mobile broadband hotspot, according to one embodiment of the invention. Diagram 400 of FIG. 4 includes graphical user interfaces (GUIs) 401 and 410. GUI 401 includes modify billing policy button 403 and billing information panel 402. GUI 410 includes administrative billing panel 412, guest user billing panels 413 and 416 and save and exit button 419. Guest user billing panel 413 includes fee arrangement check box 414 and free usage check box 415. Guest user billing panel 416 includes fee arrangement check box 417 and free usage check box 418.

As previously discussed, mobile broadband hotspot 101 of FIG. 1 may keep track of the data usage of a user by associating the data usage with a user's credential, which may comprise information such as a username, password, and personal billing information. During initial authentication with mobile broadband hotspot 101, the user may also be prompted to input personal billing information so the user may be properly billed for data usage by mobile broadband hotspot 101. In an alternate embodiment, the mobile broadband hotspot 101 may obtain billing information passively from the user device. The user profiles, including the credentials, may be stored within memory 104 of FIG. 1. The description for FIG. 4 may further describe one method of modifying billing policy 120.

In the present embodiment, GUI 401 may comprise a graphical user interface displayed within a web browser, browser pop-up, applet, or any other visual representation component displayed on display 113 of FIG. 1. GUI 401 may be used to modify billing policy 120 and the modifications may be performed from a device with administrative permission, such as administrative device 102. Thus, GUI 401 may be presented on display 113 of administrative device 102. GUI 401 may be generated by device module 111 of FIG. 1.

In the present embodiment, administrative billing panel 402 may show a portion of the present billing policy set on mobile broadband hotspot 101. The present billing policy may reflect some information within billing policy 120 of FIG. 1. In the present embodiment, the administrator or owner of mobile broadband hotspot 101 may, by default, be required to pay for all data usage through mobile broadband hotspot 101. Another user "Jenny" may be required to pay her proportionate data usage if administrator decides to charge Jenny for Jenny's data usage. Another user, "Bob" may also be charged. Billing policy button 403 may be used to bring forth GUI 410.

GUI 410 may comprise a graphical user interface displayed from an applet, web browser, browser pop-up, or any other visual presentation component. Billing information panel 412 may comprise a graphical panel displaying the present fee agreement between the administrator and an Internet service provider for mobile broadband hotspot 101. In an alternate embodiment, billing information panel 412 may comprise a graphical panel displaying the current account balances (e.g., monetary, remaining data balance, etc.) between the administrator and an Internet service provider for mobile broadband hotspot 101 Guest user panel 413 may allow the administrator to set a fee arrangement for guest user "Bob." Fee arrangement check box 414 may be used to set a fee arrangement into billing policy 120 for guest Bob. This fee arrangement may require Bob to pay a bill with an amount proportionate to Bob's data usage. Free usage check box 415 may be used to create a fee arrangement in which Bob will not be charged for Bob's data usage. In an embodiment, only fee arrangement check box 414 or free usage check box 415 may be selected. In the present embodiment, free usage check box 415 may be chosen to let Bob consume data without charge. In other embodiments, users with guest permission may be automatically required by billing policy 120 to pay for their data usage until further modification to billing policy 120. Accordingly, billing policy 120 may comprise a fee arrangement between guest user Bob and the administrator in which Bob may not be charged for any data usage. Accordingly, billing policy 120 may also be modified or updated by administrative device 102 of the plurality of devices. In alternative embodiments, billing policy 120 may be modified by central billing server 180 of FIG. 1.

In another embodiment, billing policy 120 may comprise a fee arrangement, wherein the fee arrangement may require the credential to accept additional billing from another credential. For example, the administrator may require Bob to pay the data usage bill of another credential associated with Jenny, for example. In other embodiments, billing policy 120 may allow administrator to limit the amount of data usage by Bob's device but charge Bob the full amount up to the limit of the data usage regardless if Bob's data consumption reaches the set limit. In yet other embodiments, billing policy 120 may be modified so that users are allocated data usage based on permission level and pay according to the allocated amount of total data. In yet other embodiments, billing policy 120 may comprise prepay billing arrangements for users or groups of users. The prepay billing arrangements may require the users or groups of users to submit payment before mobile broadband hotspot 101 grants any service. In alternative embodiments, billing policy 120 may also comprise a post pay billing arrangement, which trusts and expects the users or groups of users to pay for usage at the end of a billing cycle. Central billing system 180 may credit administrator or owner of mobile broadband hotspot 101 for providing network access to other devices, such as target device 103, for example.

Guest user billing panel 416 may allow the administrator to modify a fee arrangement for guest user "Jenny." Fee arrangement check box 417 may be used to set a billing policy for guest Jenny, which may require Jenny to pay proportionately to Jenny's data usage. Free usage check box 418 may be used to indicate that Jenny may not need to pay for any data usage performed by Jenny. In an embodiment, only one of fee arrangement check box 417 and free usage check box 418 may be selected. In the present embodiment, fee arrangement check box 417 may be selected and Jenny may be required to pay a bill proportionate to Jenny's data usage.

In alternative embodiments, billing policy 120 may be updated to designate a portion of any data usage to be non-billable. For example, billing policy 120 may allow Bob to use up to an initial 500 megabytes of data without charge and then pay for any additional data usage beyond the first 500 megabytes. In another example, billing policy 120 may designate data usage from accessing particular web sources to be non-billable. In other embodiments, billing policy 120 may be configured to set a limit for the data usage for a credential. For example, billing policy 120 may limit Bob to pay for up to but no more than 500 megabytes. Bob may be limited to up to 500 megabytes. In the present embodiment, billing policy 120 may also work in conjunction with network policies in network policy 121 of FIG. 1. Save and exit button 419 may be used to save any present modifications to billing policy 120.

Figure 5:
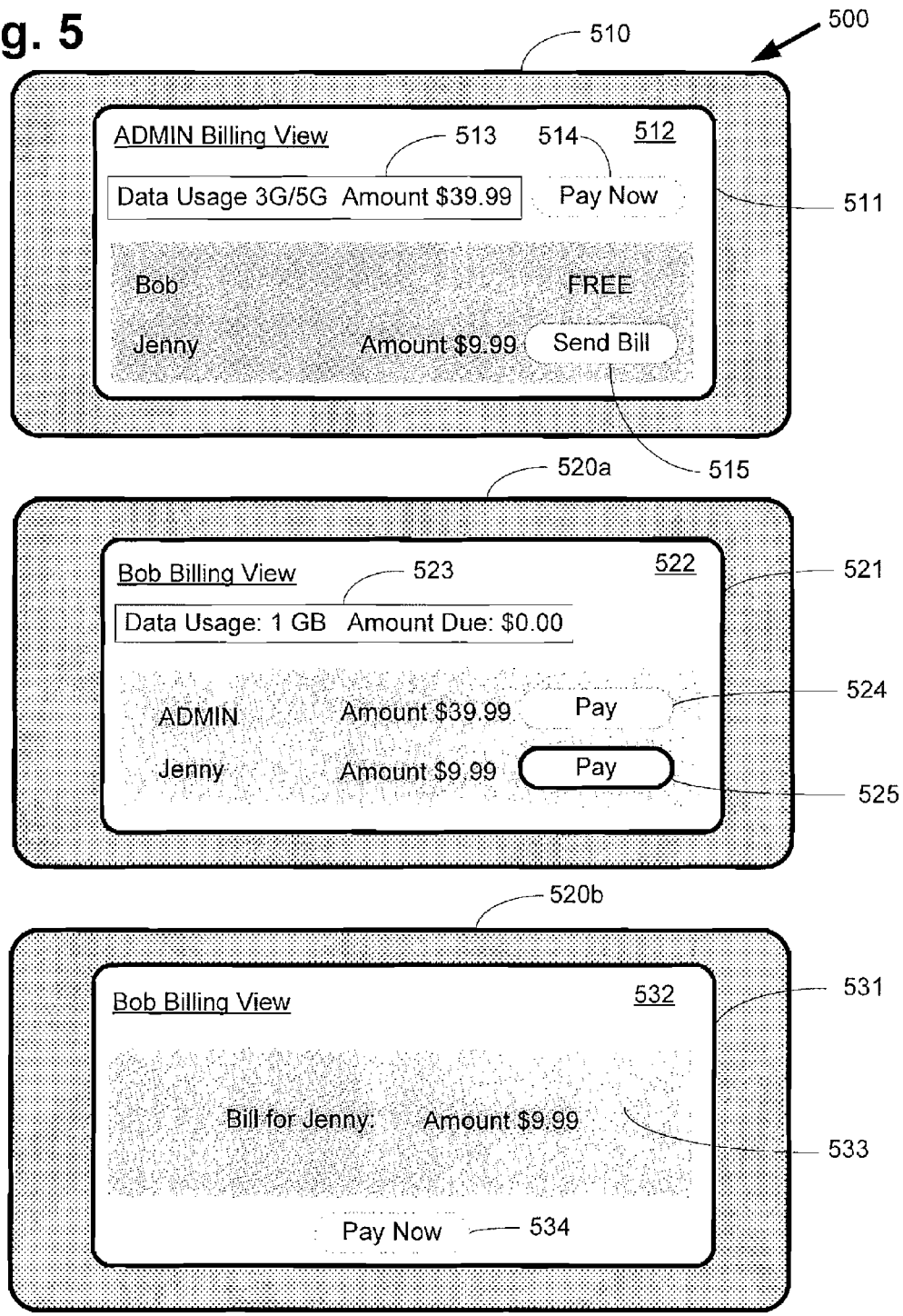
FIG. 5 presents a diagram of exemplary graphical user interfaces for allowing users to pay personal data usage bills and the data usage bills of other users, according to one embodiment of the invention.

FIG. 5 presents a diagram of exemplary graphical user interfaces for allowing users to pay personal data usage bills and the data usage bills of other users, according to one embodiment of the invention. Diagram 500 of FIG. 5 includes displays, 510, 520*a*, and 520*b*. Display 510 includes applet 511. Applet 511 includes billing interface 512. Billing interface 512 includes bill amount panel 513, pay button 514, and send bill button 515. Display 520*a* includes applet 521. Applet 521 includes billing interface 522, bill amount panel 523, pay administrator button 524, and pay guest button 525. Display 520*b* includes applet 531. Applet 531 includes billing interface 532. Billing interface 532 includes bill statement panel 533 and pay now button 534.

Display 510 may correspond to display 113 of FIG. 1. Applet 511 may comprise any type of applet. Billing interface 512 may be presented within applet 511. Bill amount panel 513 may present the data usage and amount for the data usage. Pay button 514 may be used to pay the amount shown in bill amount panel 513. Send bill button 515 may be used to send a billing statement to a guest user. In the present embodiment, send bill button 515 may be used to send a billing statement to the device for presentation on a display of that device used by "Jenny."

Display 520a may correspond to display 118 of FIG. 1. Applet 521 may comprise any type of graphical applet. Billing interface 522 may be presented within applet 521. Bill amount panel 523 may present the bill for a user named "Bob." Bob may already be in a fee arrangement in which Bob may not be charged for personal data usage. Pay administrator button 524 and pay guest button 525 may be used to allow Bob to pay data usage bills for the administrator or for another user named Jenny, respectively. As previously described, processor 107 of FIG. 1, executing hotspot module 105 of FIG. 1, may receive a request from a device to pay for another data usage associated with another credential. Pay administrator button 524 and pay guest button 525 may be used to send such a request from the device used by Bob to mobile broadband hotspot 101.

Display 520b may correspond to display 520a. Applet 531 may comprise any type of applet and billing interface 532 includes billing statement panel 533 which may present the bill amount for Jenny that Bob may now be responsible for paying. Billing interface 532 may appear after Bob uses pay guest button 525. Billing statement panel 533 may represent the billing statement transmitted from mobile broadband hotspot 101 after receiving a request from Bob to pay for Jenny's data usage.

Figure 6:
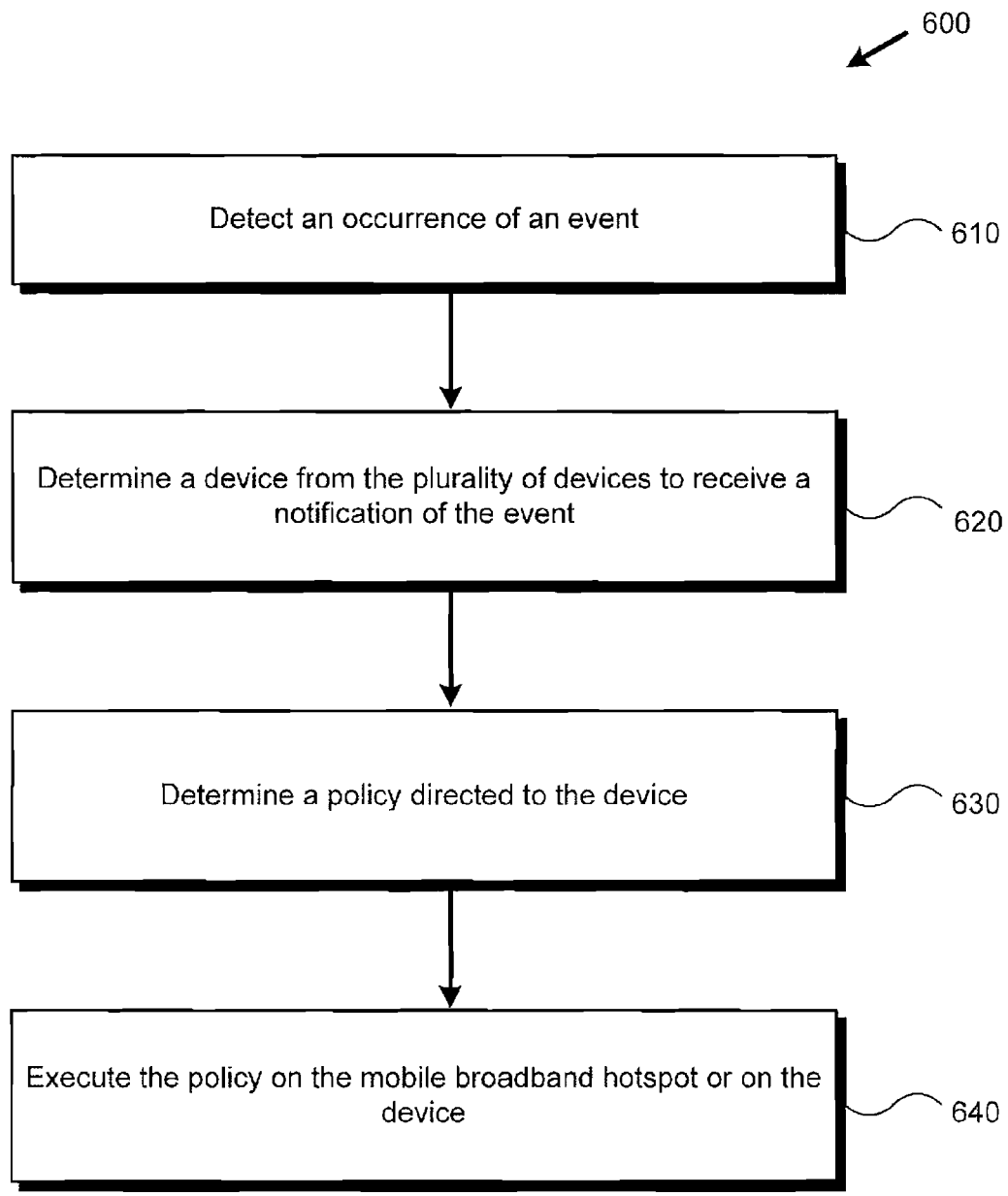
FIG. 6 shows a flowchart describing the steps by which a mobile broadband hotspot may manage a hotspot network access of a plurality of devices, according to one embodiment of the present invention.

FIG. 6 shows a flowchart describing the steps by which a mobile broadband hotspot may manage a hotspot network access of a plurality of devices, according to one embodiment of the present invention. Certain details and features have been left out of flowchart 600 that are apparent to a person of ordinary skill in the art. Thus, a step may comprise one or more sub-steps or may involve specialized equipment or materials, for example, as known in the art. While steps 610 through 630 indicated in flowchart 600 are sufficient to describe one embodiment of the present method, other embodiments may utilize steps different from those shown in flowchart 600, or may include more, or fewer steps.

Referring to step 610 of flowchart 600 in FIG. 6 and environment 100 of FIG. 1, step 610 of flowchart 600 comprises processor 107 configured to detect an occurrence of an event. As previously discussed, hotspot module 105 may be configured to detect events that may affect the overall performance or quality of service of mobile broadband hotspot 101, thereby by affecting the user experience from the plurality of devices connected to mobile broadband hotspot 101.

Referring to step 620 of flowchart 600 in FIG. 6 and environment 100 of FIG. 1, step 620 of flowchart 600 comprises processor 107 configured to determine a device from the plurality of devices to receive a notification of the event. As previously discussed, any notification of the events detected in step 610 may be required to be transmitted to administrative device 102. These notifications may also be selectively transmitted to other devices without administrative devices, such as target device 103.

Referring to step 630 of flowchart 600 in FIG. 6 and environment 100 of FIG. 1, step 630 of flowchart 600 comprises processor 107, executing hotspot module 105, to determine a policy directed to a device. As previously discussed, after determining a device to receive a notification in step 620, mobile broadband hotspot 101 may decide upon a policy that will be directed to that device as well.

Referring to step 640 of flowchart 600 in FIG. 6 and environment 100 of FIG. 1, step 640 of flowchart 600 comprises processor 107, executing hotspot module 105, to execute a policy on mobile broadband hotspot 101 or on another device, such as target device 103. As previously discussed, the policy determined from step 630 may be executed which in turn may cause mobile broadband hotspot 101 to affect other devices. In less common instances, the policy may be executed on some other mobile device such as target device 103 in order to affect that target device 103.

Figure 7:
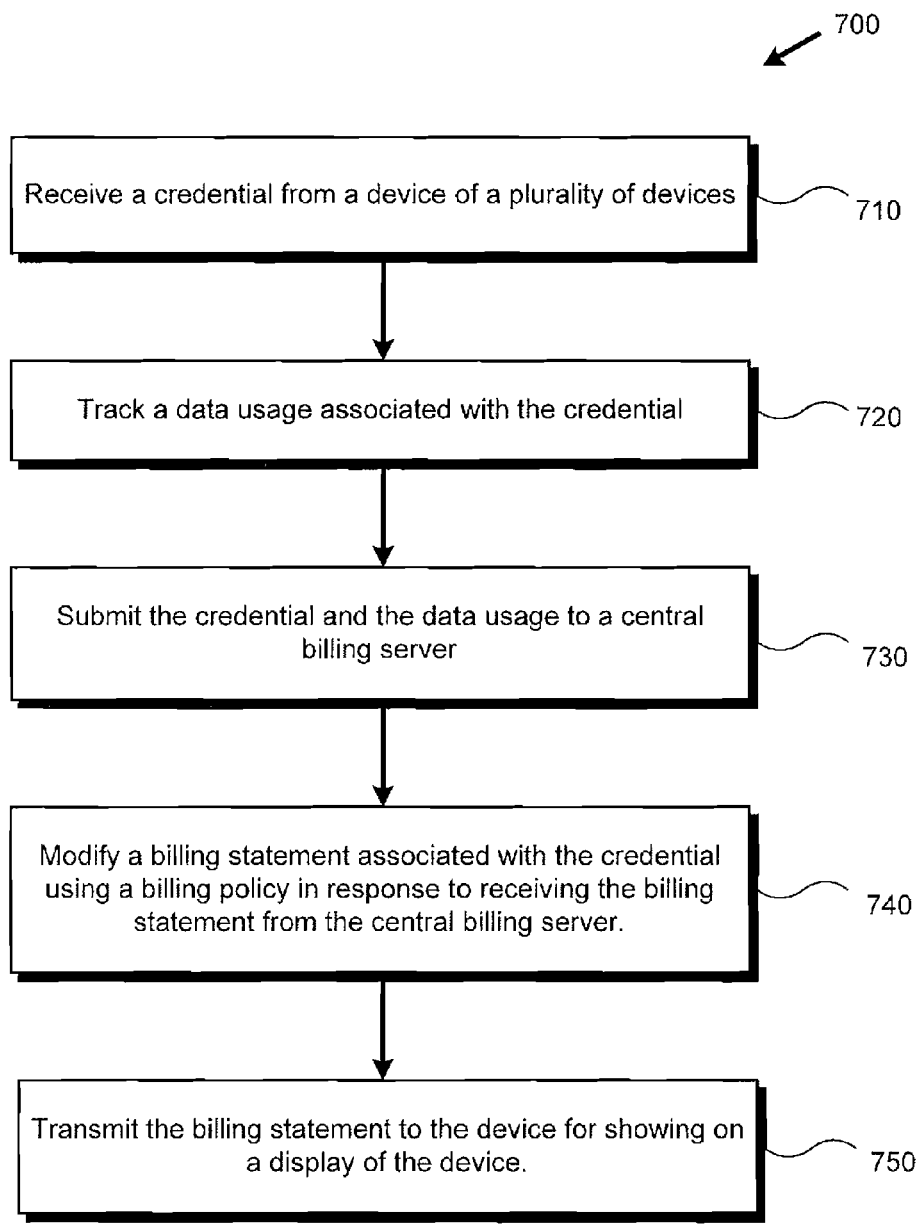
FIG. 7 shows a flowchart describing the steps by which a mobile broadband hotspot may manage billing for hotspot network access, according to one embodiment of the present invention.

FIG. 7 shows a flowchart describing the steps by which a mobile broadband hotspot for managing billing for hotspot network access, according to one embodiment of the present invention. Certain details and features have been left out of flowchart 700 that are apparent to a person of ordinary skill in the art. Thus, a step may comprise one or more sub-steps or may involve specialized equipment or materials, for example, as known in the art. While steps 710 through 750 indicated in flowchart 700 are sufficient to describe one embodiment of the present method, other embodiments may utilize steps different from those shown in flowchart 700, or may include more, or fewer steps.

Referring to step 710 of flowchart 700 in FIG. 7 and environment 100 of FIG. 1, step 710 of flowchart 700 comprises processor 107 configured to receive a credential from a device of a plurality of devices. As previously discussed, a credential may be information identifying a unique individual and may be included in a user profile. A credential may include a username, password, personal billing information, device identification numbers, or any other pertinent information that may be demanded by hotspot module 105. The credential may be submitted from the device attempting to connect to mobile broadband hotspot and the credential may be stored within billing policy 120. A returning user may be required to submit information matching a credential before reconnecting to mobile broadband hotspot 101. The matched credential may be used to authenticate the user.

Referring to step 720 of flowchart 700 in FIG. 7 and environment 100 of FIG. 1, step 720 of flowchart 700 comprises processor 107 configured to track a data usage associated with the credential. As previously discussed, mobile broadband hotspot 101 may track data usage for a plurality of credentials. Each credential and associated data usage may be stored within memory 104.

Referring to step 730 of flowchart 700 in FIG. 7 and environment 100 of FIG. 1, step 730 of flowchart 700 comprises processor 107 configured to submit the credential and data usage to central billing server 180. As previously discussed, the credential received in step 710 and the associated data usage of the credential received from step 720 may be transmitted from mobile broadband hotspot 101 to central billing server 180 or to any other billing server.

Referring to step 740 of flowchart 700 in FIG. 7 and environment 100 of FIG. 1, step 740 of flowchart 700 comprises processor 107 configured to modify a billing statement associated with the credential using billing policy 120 in response to receiving the billing statement from central billing server 180. After transmitting a credential and associated data usage to central billing server 180 (or alternately to a local billing module), mobile broadband hotspot 101 may receive a billing statement from central billing server 180 (or alternately to a local billing module). Central billing system 180 may not be privy to fee arrangements and other policies set in billing policy 120. Mobile broadband hotspot 101 may use billing policy 120 to modify the billing statement to reflect current fee arrangement and other billing policies. As previously explained, some data usage may be non-billable, and some users may be required to pay for a data usage of another credential.

Referring to step 750 of flowchart 700 in FIG. 7 and environment 100 of FIG. 1, step 750 of flowchart 700 comprises processor 107 configured to transmit the billing statement to the device for showing on a display of the device. Once the billing statement has been properly presented on a display, user of device may perform an electronic fee pay from the display of the device, in one embodiment. As previously explained, the billing statement, in other embodiments, may be a prepay billing statement sent to the user prior to service being granted. In other embodiments, the billing statement may be a post usage billing statement sent to the user after network 150 access service has been provided over a billing period or policy period. In other embodiments, mobile broadband hotspot 101 may have other payment arrangements with users.

Thus, a system and method for managing hotspot network access of a plurality of devices has been disclosed. In an effort to improve network connectivity and positive user experience, a mobile broadband hotspot may alert devices of events that may affect the quality of service provided by the mobile broadband hotspot. The notifications of events may be generally delivered to administrative devices and to other devices with lower permission levels. The mobile broadband hotspot and/or administrative devices may manually select one or more policies to execute in order to maintain better connectivity for all users. Hotspot module 105 may allow policies to be executed that affect only a subset of the devices connected to mobile broadband hotpot.

Moreover, a system and method for managing the billing of a hotspot network access has been disclosed. Instead of generating a billing statement that bills only the owner of the data plan of the mobile broadband hotspot, the present system and method allows for flexible billing. During network access, the owner may require other device users to assume a portion of the bill. Other users may even decide to assume the bill of the owner or users of other device who may have been billed. Therefore, the bill may be properly divided among users and the billing statement generated may accurately reflect the separate billings.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangement, modifications, and substitutions without departing from the scope of the invention.

What is claimed is:

1. A mobile broadband hotspot for managing hotspot network access of a plurality of devices, the mobile broadband hotspot comprising:
a display; and
a processor configured to:
detect an occurrence of a bandwidth usage event while a device of the plurality of devices is communicating data through the mobile broadband hotspot, the bandwidth usage event being a result of an amount of data bandwidth being used by the device through the mobile broadband hotspot;
determine, in response to the detecting, that the device from the plurality of devices is to receive a notification of the bandwidth usage event;
send, in response to the determining, the notification of the bandwidth usage event to an administrative device for showing on a display of the administrative device;
send, in response to the determining, the notification of the bandwidth usage event to the device for showing on a display of the device;
obtain a policy directed to the device in response to detecting the bandwidth usage event;
execute the policy on at least one of the mobile broadband hotspot and the device;
detect an occurrence of a low battery event while the device of the plurality of devices is communicating data through the mobile broadband hotspot, the low battery event being indicative of a low battery condition of the mobile broadband hotspot; and
send, in response to the detecting of the occurrence of the low battery event, a low battery notification to the device for showing on the display of the device.

2. The mobile broadband hotspot of claim 1, wherein the processor is further configured to display, in response to the determining, the notification of the bandwidth usage event on the display of the mobile broadband hotspot.

3. The mobile broadband hotspot of claim 1, wherein the policy comprises an action to change a permission level.

4. The mobile broadband hotspot of claim 1, wherein the bandwidth usage event comprises the device consuming a percentage of the bandwidth exceeding a pre-determined percentage.

5. The mobile broadband hotspot of claim 1, wherein the bandwidth usage event comprises the device consuming within a predetermined period of time a total number of bytes exceeding an allotted number of bytes for the predetermined period of time.

6. The mobile broadband hotspot of claim 1, wherein the bandwidth usage event comprises the device consuming a disproportionate amount of data relative to an amount of data consumed by the plurality of devices.

7. The mobile broadband hotspot of claim 1, wherein the bandwidth usage event further comprises a downgrading of a broadband connectivity of the mobile broadband hotspot.

8. The mobile broadband hotspot of claim 1, wherein the processor is further configured to:
display, in response to the detecting of the occurrence of the low battery event, the low battery notification on the display of the mobile broadband hotspot.

9. A method for use by a mobile broadband hotspot for managing hotspot network access of a plurality of devices, the method comprising:
detecting an occurrence of a bandwidth usage event while a device of the plurality of devices is communicating data through the mobile broadband hotspot, the bandwidth usage event being a result of an amount of data bandwidth being used by the device through the mobile broadband hotspot;
determining, in response to the detecting, that the device from the plurality of devices is to receive a notification of the bandwidth usage event;
sending, in response to the determining, the notification of the bandwidth usage event to an administrative device for showing on a display of the administrative device;
sending, in response to the determining, the notification of the bandwidth usage event to the device for showing on a display of the device;
obtaining a policy directed to the device in response to detecting the bandwidth usage event;
executing the policy on at least one of the mobile broadband hotspot and the device;

detecting an occurrence of a low battery event while the device of the plurality of devices is communicating data through the mobile broadband hotspot, the low battery event being indicative of a low battery condition of the mobile broadband hotspot; and sending, in response to the detecting of the occurrence of the low battery event, a low battery notification to the device for showing on the display of the device.

10. The method of claim 9 further comprising displaying, in response to the determining. the notification of the bandwidth usage event on a display of the mobile broadband hotspot.

11. The method of claim 9, wherein the policy comprises an action to change a permission level.

12. The method of claim 9, wherein the bandwidth usage event comprises the device consuming a percentage of the bandwidth exceeding a pre-determined percentage.

13. The method of claim 9, wherein the bandwidth usage event comprises the device consuming a disproportionate amount of data relative to an amount of data consumed by the plurality of devices.

14. The method of claim 9, wherein the bandwidth usage event comprises the device consuming within a predetermined period of time a total number of bytes exceeding an allotted number of bytes for the predetermined period of time.

15. The method of claim 9, wherein the bandwidth usage event further comprises a downgrading of a broadband connectivity of the mobile broadband hotspot.

16. The method of claim 9 further comprising:

displaying, in response to the detecting of the occurrence of the low battery event, the low battery notification on a display of the mobile broadband hotspot.

\* \* \* \* \*

UNITED STATES PATENT AND TRADEMARK OFFICE
CERTIFICATE OF CORRECTION

| | | |
|---|---|---|
| PATENT NO. | : 8,989,159 B2 | Page 1 of 1 |
| APPLICATION NO. | : 13/248391 | |
| DATED | : March 24, 2015 | |
| INVENTOR(S) | : David Sperling et al. | |

It is certified that error appears in the above-identified patent and that said Letters Patent is hereby corrected as shown below:

In the claims,

Column 19, line 10, claim 10, "determining." should be changed to --determining,--

Signed and Sealed this
Eighteenth Day of August, 2015

Michelle K. Lee
*Director of the United States Patent and Trademark Office*